United States Patent [19]

Tanaka

[11] Patent Number: 4,797,739
[45] Date of Patent: Jan. 10, 1989

[54] METHOD OF COMPRESSING AND RECONSTRUCTING IMAGE SIGNALS BY VECTOR QUANTIZATION

[75] Inventor: Nobuyuki Tanaka, Kanagawa, Japan

[73] Assignee: Fuji Photo Film Co., Ltd., Kanagawa, Japan

[21] Appl. No.: 160,372

[22] Filed: Feb. 25, 1988

[30] Foreign Application Priority Data

Feb. 25, 1987 [JP] Japan .................................. 62-42111
Feb. 24, 1988 [JP] Japan .................................. 63-41713

[51] Int. Cl.$^4$ ............................................ H04N 7/133
[52] U.S. Cl. ...................................... 358/133; 358/263
[58] Field of Search ................................ 358/133, 263

[56] References Cited

U.S. PATENT DOCUMENTS

| | | | |
|---|---|---|---|
| 4,410,916 | 10/1983 | Pratt | 358/263 |
| 4,494,150 | 1/1985 | Brickman | 358/263 |
| 4,703,362 | 10/1987 | Deutermann | 358/263 |
| 4,706,264 | 11/1987 | Cung | 358/263 |
| 4,724,483 | 2/1988 | Shinada | 358/133 |

*Primary Examiner*—Howard W. Britton
*Attorney, Agent, or Firm*—Sughrue, Mion, Zinn, Macpeak & Seas

[57] ABSTRACT

A method of compressing and reconstructing image signals by vector quantization comprises the steps of dividing two-dimensional image signals into blocks each comprising a fixed number of samples, selecting a vector that corresponds with the minimum distortion to the image signals in each block from a code book comprising a plurality of different vectors and prepared by defining the fixed number of vector elements, encoding the information on the selected vector to correspond to each block, and taking the vector elements of the vector, which the encoded information represents, as reconstructed signals of each block. In the case where the reconstructed signals attains a value between image signals "a" and "b" and having a relationship of $b-a=\alpha$ where $\alpha$ denotes the minimum level difference corresponding to a density resolution of an image reproducing apparatus, the reconstructed signal is transformed to the image signal "a" or "b" by giving a larger probability weight to the image signal "a" or "b", whichever is closer to the reconstructed signal.

3 Claims, 2 Drawing Sheets

METHOD OF COMPRESSING AND RECONSTRUCTING IMAGE SIGNALS BY VECTOR QUANTIZATION

BACKGROUND OF THE INVENTION

1. Field of the Invention

This invention relates to a method of compressing and reconstructing image signals. This invention particularly relates to a method of compressing and reconstructing image signals by vector quantization.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

One of the methods of image signal compression that has heretofore been known is a method wherein vector quantization is utilized. The known method comprises the steps of (i) dividing two-dimensional image signals into blocks each comprising a fixed number of samples, (ii) selecting a vector that corresponds with the minimum distortion to the set of the image signals in each of the blocks from a code book comprising a plurality of vectors different from one another and prepared in advance by defining the fixed number of vector elements, and (iii) encoding the information representing the selected vector to correspond to the block.

Since the image signals in the block as mentioned above have high correlation therebetween, the image signals in each block can be represented very accurately by one of a comparatively small number of vectors prepared in advance. Therefore, transmission or recording of the image signals can be carried out by transmitting or recording a code representing the vector, instead of the image signals themselves, and signal compression can thus be achieved. By way of example, the amount of the image signals at 64 picture elements in a half tone image of a density scale composed of 256 levels (=8 bits) is $8 \times 64 = 512$ bits. In the case where the 64 picture elements are grouped as a single block, the respective image signals in the block are expressed by a vector composed of 64 vector elements, and a code book including 256 such vectors is prepared, the amount of the signals per block becomes equal to the amount of the signals for discrimination between the vectors, i.e. 8 bits. Consequently, in this case, the amount of the signals can be compressed to $8/(8 \times 64) = 1/64$.

After the image signals are compressed in the manner as mentioned above and recorded or transmitted in the compressed form, the vector elements of each of the vectors which the vector discriminating information represents are taken as reconstructed signals of each of the blocks, and the original image is reproduced by use of the reconstructed signals.

On the other hand, in the case where the image signals are compressed and reconstructed in the manner as mentioned above, the vector elements of each vector are often defined at levels exceeding the resolution of an image reproducing apparatus. Specifically, by way of example, the density resolution of the image reproducing apparatus may be 256 levels (for simplicity of explanation, the levels are assumed to range from 1 to 256), and the vector elements may be defined by numerals of 25,600 levels (for simplicity of explanation, the levels are assumed to range from 1.00 to 256.00). In such a case, the lower order part of each of the vector elements has heretofore been raised or discarded. Specifically, in the aforesaid example, when the vector elements attains a value of 25.65, the density level has heretofore been taken always as 26 or 25. However, when such raising or discarding is carried out, the image quality of the reproduced image is deteriorated.

SUMMARY OF THE INVENTION

The primary object of the present invention is to provide a method of compressing and reconstructing image signals by vector quantization, wherein the image quality of an image reproduced via signal compression utilizing vector quantization is prevented from deteriorating.

Another object of the present invention is to provide a method of compressing and reconstructing image signals by vector quantization, which enables application of signal compression utilizing vector quantization to image of a high image quality.

The present invention provides a method of compressing and reconstructing image signals by vector quantization, which comprises the steps of:

(i) dividing two-dimensional image signals into blocks each comprising a fixed number of samples, (ii) selecting a vector that corresponds with the minimum distortion to the set of the image signals in each of the blocks from a code book comprising a plurality of vectors different from one another and prepared in advance by defining the fixed number of vector elements, (iii) encoding the information representing the selected vector to correspond to each of the blocks, and (iv) taking the vector elements of the vector, which the encoded information represents, as reconstructed signals of each of the blocks, wherein the improvement comprises the steps of, in the case where said reconstructed signal attains a value between image signals "a" and "b" subjected to image reproduction and having a relationship of $b - a = \alpha$ where $\alpha$ denotes the minimum level difference corresponding to a density resolution of an image reproducing apparatus:

(a) transforming said reconstructed signal to said image signal "a" or said image signal "b" by giving a larger probability weight to said image signal "a" or said image signal "b", whichever is closer to said reconstructed signal.

Transformation of the reconstructed signal by probability weighting is carried in such a manner that, in the case where the reconstructed signal determined by the vector elements attains a value of 25.65, the reconstructed signal is transformed to the image signal having a value of 26 with a probability of, for example, 65%, and is transformed to the image signal having a value of 25 with a probability of, for example, 35%. In this manner, the image quality of the reproduced image is improved.

With the method of compressing and reconstructing image signals by vector quantization in accordance with the present invention, the image quality of the image reconstructed via signal compression utilizing vector quantization can be improved. Therefore, the range of application of signal compression utilizing vector quantization can be extended up to the case where images having a high image quality are required. Also, the signal compressibility can be increased markedly as compared with the conventional technique.

DESCRIPTION OF THE PREFERRED EMBODIMENTS

The present invention will hereinbelow be described in further detail with reference to the accompanying drawings.

Figure 1:
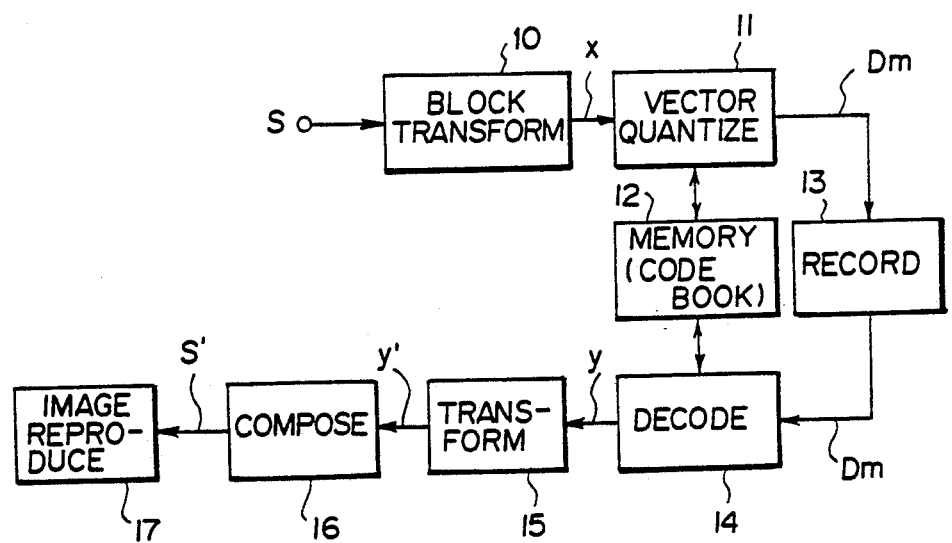
FIG. 1 is a block diagram showing the configuration of an apparatus for carrying out the method of compressing and reconstructing image signals by vector quantization in accordance with the present invention.
Figure 2:
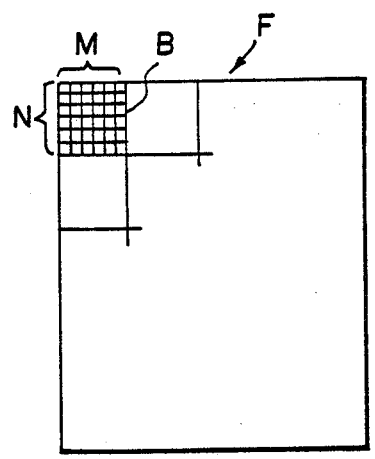
FIG. 2 is an explanatory view showing the division of image signals into blocks.

With reference to FIG. 1, original image signals S representing a single continuous tone image are fed to a block transformation circuit 10 in which they are transformed into original image signals x of each of rectangular blocks which comprises M×N picture elements. The division into the blocks is shown in FIG. 2. With reference to FIG. 2, F denotes the original image, and B denotes a single block. For simplicity of explanation, the block B is assumed to comprise 6×6 picture elements in the descriptions below.

The original image signals x of the block B are then fed to a vector quantizer 11. The vector quantizer 11 selects a vector, that corresponds with the minimum distortion to the set of the fed original image signals x of the block B (the set comprises 36 signals), from a plurality of vectors stored as a code book in a memory 12. Specifically, the memory 12 stores a code book representing, by way of example, 256 vectors $\vec{x}(1)$, $\vec{x}(2)$, $\vec{x}(3)$, . . . , $\vec{x}(256)$ respectively defining 36 vector elements $\hat{x}_1^{(n)}$, $\hat{x}_2^{(n)}$, . . . , $\hat{x}_{36}^{(n)}$ where n=1, 2, . . . , 256 as shown below.

$$\vec{x}(1) = (\hat{x}_1^{(1)}, \hat{x}_2^{(1)}, \hat{x}_3^{(1)}, \ldots \hat{x}_{36}^{(1)})$$
$$\vec{x}(2) = (\hat{x}_1^{(2)}, \hat{x}_2^{(2)}, \ldots \hat{x}_{36}^{(2)})$$
$$\vec{x}(3) = (\hat{x}_1^{(3)}, \hat{x}_2^{(3)}, \ldots \hat{x}_{36}^{(3)})$$
$$\vdots$$
$$\vec{x}(256) = (\hat{x}_1^{(256)}, \hat{x}_2^{(256)}, \ldots \hat{x}_{36}^{(256)})$$

The vector quantizer 11 finds a vector $\vec{x}(m)$ whose vector elements ($\hat{x}_1$, $\hat{x}_2$, $\hat{x}_3$, . . . , $\hat{x}_{36}$) correspond with the minimum distortion to the set ($x_1$, $x_2$, $x_3$, . . . , $x_{36}$) of the original image signals x, and outputs an encoded signal Dm which represents a vector identification number "m" representing the vector $\vec{x}(m)$. As the distortion, by way of example, the mean square error expressed as $$d = \frac{1}{k} \sqrt{\sum_{i=1}^{k} |X_i - \hat{X}_i|^2}$$

is utilized (k=36 in this example). In order to find such a vector $\vec{x}(m)$ that the distortion is the minimum, the distortion may be calculated for all of the vectors, and the vector $\vec{x}(m)$ exhibiting the minimum distortion may be found (this method is referred to as total search type vector quantization). Alternatively, in order to shorten the processing time, binary tree search type vector quantization may be carried out though the distortion may not completely become the minimum.

An appropriate code book comprising the vectors respectively defining the vector elements ($\hat{x}_1$, $\hat{x}_2$, $\hat{x}_3$, . . . , $\hat{x}_{36}$) may be prepared by preparing a training image of the same type as the image on which signal compression is to be carried out, and using a known method on the basis of the training image.

In this embodiment, the vector identification signal Dm may be such that the 256 vectors can be discriminated from one another, and can therefore be expressed by 8 bits. Therefore, in the case where the density scale of each picture element is of 256 levels (=8 bits), the image signals in the amount of 8 bits×36 (picture elements) can be expressed by 8 bits, and the signal compressibility becomes 1/36.

The vector selection and the output of the vector identification signal Dm as mentioned above are carried out for all of the blocks B in a single image which the original image signals S represent. In this embodiment, the vector identification signals Dm thus generated are recorded on a recording medium (image file) such as an optical disk or a magnetic disk in a recording and reproducing apparatus 13. In the case where the division of the overall original image signals S into the blocks is carried out in a predetermined sequence, the vector identification signals Dm fed sequentially to the recording and reproducing apparatus 13 can be recorded so as to correspond to the respective blocks B. In order to have the vector identification signals Dm correspond to the respective blocks B, block identification signals may be added to the vector identification signals Dm in the course of the recording. As mentioned above, each of the vector identification signals Dm can be expressed by a signal amount markedly smaller than the amount of the original image signals x, a large number of the images can be recorded on the recording medium such as the optical disk.

In the course of image reproduction, each of the vector identification signals Dm indirectly representing the image signals is read from the recording medium, and is transformed by a decoder 14 into reconstructed signals y. Specifically, the decoder 14 reads the vector, which the vector identification signals Dm fed thereto represents, from the code book stored in the memory 12, and outputs the vector elements ($\hat{x}_1$, $\hat{x}_2$, $\hat{x}_3$, . . . , $\hat{x}_{36}$), which are defined for said vector, as the reconstructed signals y for a single block B.

The reconstructed signals y are subjected to transformation processing in a transformation circuit 15 as will be described later, and then sent to a composing circuit 16. In the composing circuit 16, the reconstructed signals y are transformed from the signals per block to sequential signals per picture element line. The image signals S' obtained by said transformation in the composing circuit 16 have slight distortion with respect to the original image signals S, and are approximately equal to the original image signals S. The image signals S' are ultimately sent to an image reproducing apparatus 17. In the image reproducing apparatus 17, an image approximately identical with the original image that the original image signals S represent is reproduced on the basis of the image signals S'.

Transformation processing as one of the features of the present invention carried out by the transformation circuit 15 will be described hereinbelow. The image reproducing apparatus 17 can reproduce a continuous tone image of a density scale of 256 levels, and receives the image signals (input image signals) of the 256 levels. For simplicity of explanation, the image signal levels are herein assumed to range from 1 to 256. On the other hand, the vector elements $(\hat{x}_1, \hat{x}_2, \hat{x}_3, \ldots, \hat{x}_{36})$ defined in the aforesaid code book respectively have "fineness" 100 times the fineness of the density scale, and are defined by 25,600 levels of values. For simplicity of explanation, the levels of the values of the vector elements, i.e. the levels of the reconstructed signals y, are assumed to range from 1.00 to 256.00. By way of example, the transformation circuit 15 transforms the reconstructed signal y having a value of 1.00 to an image signal y' having a value of 1, and transforms the reconstructed signal y having a value of 256.00 to an image signal y' having a value of 256. Also, as for the reconstructed signal y attaining a value between an image signal "a" and an image signal "b" having levels adjacent to each other among the image signals y' (1, 2, 3, ..., 256), the transformation circuit 15 transforms said reconstructed signal y to the image signal "a" or the image signal "b" by giving a larger probability weight to the image signal "a" or the image signal "b", whichever is closer to said reconstructed signal y. For example, in the case where the reconstructed signal y attains a value of 25.65, the transformation circuit 15 transforms the reconstructed signal y to the image signal y' having a value of 26 with a probability of 65%, and transforms the reconstructed signal y to the image signal y' having a value of 25 with a probability of 35%.

As the vector elements $(\hat{x}_1, \hat{x}_2, \hat{x}_3, \ldots, \hat{x}_{36})$ are defined more finely, the original image is represented more accurately in the course of vector quantization. Also, by carrying out transformation in the manner as mentioned above, the "fineness" of the vector elements is reflected on the overall reproduced image. Therefore, the reproduced image having a high image quality closer to the original image can be obtained.

Probability weighting may also be carried out in any other manner. For example, in the aforesaid case, the reconstructed signal y attaining a value between 25.01 and 25.49 may be transformed to the image signal y' having a value of 25 with a probability of 70%, and may be transformed to the image signal y' having a value of 26 with a probability of 30%. On the other hand, the reconstructed signal y attaining a value between 25.50 and 25.99 may be transformed to the image signal y' having a value of 26 with a probability of 70%, and may be transformed to the image signal y' having a value of 25 with a probability of 30%.

Figure 3A:
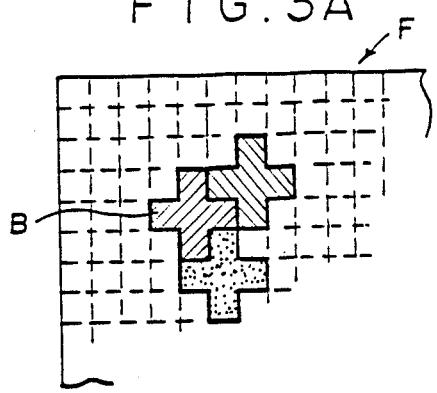
FIGS. 3A, 3B and 3C are explanatory views showing various different examples of the blocks.
Figure 3B:
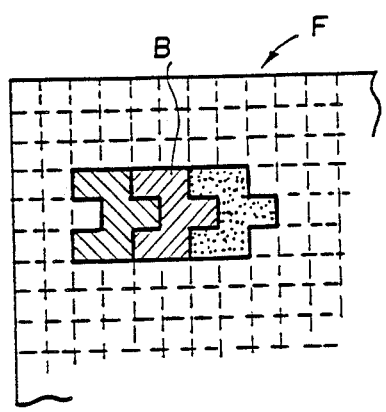
Figure 3C:
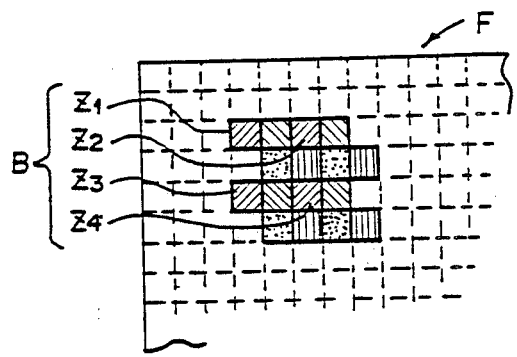

The blocks employed in the above-described embodiment are in the rectangular shape having a size of M×N picture elements. However, the blocks may be of different shape as shown in FIGS. 3A, 3B and 3C. In these figures, small square elements show picture elements and the areas B enclosed by solid lines show the picture element ranges picked up for dividing elements into the blocks. The elements constituting one block may not always be adjacent to each other as shown in FIGS. 3A and 3B but may be located close to each other as shown in FIG. 3C. By using the blocks of the shape different from the rectangular shape, the prominent step-like appearance of density difference can be eliminated.

I claim:

1. A method of compressing and reconstructing image signals by vector quantization, which comprises the steps of:
   (i) dividing two-dimensional image signals into blocks, each comprising a fixed number of samples,
   (ii) selecting a vector that corresponds with the minimum distortion to the set of the image signals in each of the blocks from a code book comprising a plurality of vectors different from one another and prepared in advance by defining said fixed number of vector elements,
   (iii) encoding the information representing the selected vector to correspond to each of the blocks, and
   (iv) taking the vector elements of the vector, which the encoded information represents, as reconstructed signals of each of the blocks,
   wherein the improvement comprises the steps of, in the case where said reconstructed signal attains a value between image signals "a" and "b" subjected to image reproduction and having a relationship of $b - a = \alpha$ where $\alpha$ denotes the minimum level difference corresponding to a density resolution of an image reproducing apparatus:
   (a) transforming said reconstructed signal to said image signal "a" or said image signal "b" by giving a larger probability weight to said image signal "a" or said image signal "b", whichever is closer to said reconstructed signal.

2. A method as defined in claim 1 wherein, in the case where said reconstructed signal has a value of "y", said reconstructed signal "y" is transformed to said image signal "a" with a probability of $(b-y)/\alpha$, and is transformed to said image signal "b" with a probability of $(y-a)/\alpha$.

3. A method as defined in claim 1 wherein, each of said blocks comprises M×N number of samples arranged in a rectangular shape having a size of M×N picture elements.

* * * * *